United States Patent
Maffe

(10) Patent No.: US 11,305,686 B2
(45) Date of Patent: Apr. 19, 2022

(54) PROTECTIVE GRID FOR MOTORCYCLE HEADLAMP AND MOTORCYCLE HEADLAMP ASSEMBLY COMPRISING SAID PROTECTIVE GRID

(71) Applicant: PIAGGIO & C. S.P.A., Pontedera (IT)

(72) Inventor: Francesco Maffe, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 16/771,492

(22) PCT Filed: Feb. 20, 2019

(86) PCT No.: PCT/IB2019/051362
§ 371 (c)(1),
(2) Date: Jun. 10, 2020

(87) PCT Pub. No.: WO2019/162843
PCT Pub. Date: Aug. 29, 2019

(65) Prior Publication Data
US 2020/0391652 A1 Dec. 17, 2020

(30) Foreign Application Priority Data

Feb. 21, 2018 (IT) .......................... 102018000002890

(51) Int. Cl.
*B60Q 1/00* (2006.01)
*B62J 23/00* (2006.01)
*B62J 6/026* (2020.01)
*B62J 27/30* (2020.01)

(52) U.S. Cl.
CPC ............ *B60Q 1/0005* (2013.01); *B62J 6/026* (2020.02); *B62J 23/00* (2013.01); *B62J 27/30* (2020.02)

(58) Field of Classification Search
CPC .......... B60Q 1/0005; B62J 6/026; B62J 23/00
See application file for complete search history.

(56) References Cited

FOREIGN PATENT DOCUMENTS

| CN | 201772394 U | 3/2011 |
|---|---|---|
| DE | 1734211 U | 11/1956 |
| DE | 8706415 U1 | 10/1987 |
| EP | 1985913 A1 | 10/2008 |
| JP | 62113661 A | 5/1987 |
| JP | 0527902 U | 4/1993 |
| JP | 11102606 A | 4/1999 |

OTHER PUBLICATIONS

International Search Report for corresponding application No. PCT/IB2019/051362 filed on Feb. 20, 2019; dated Apr. 26, 2019.

*Primary Examiner* — Joseph L Williams
(74) *Attorney, Agent, or Firm* — Cantor Colburn LLP

(57) ABSTRACT

Protective grid adapted and configured to be coupled to a vehicle headlamp, where the vehicle headlamp is adapted and configured to emit a light beam, the protective grid including at least one grid element, and coupling means for operatively coupling the grid element, directly or indirectly, to the vehicle headlamp the coupling means, when the protective grid is operatively coupled to the vehicle headlamp, are adapted and configured for allowing the grid element to be moved such that the grid element can be displaced from a work configuration to a rest configuration, where in the work configuration the grid element is such to intercept the light beam and where in the rest configuration the grid element is placed so that it does not intercept the light beam, the protective grid including locking means configured to keep the at least one grid element in the rest and/or work configuration during motion of the motorcycle.

15 Claims, 2 Drawing Sheets

PROTECTIVE GRID FOR MOTORCYCLE HEADLAMP AND MOTORCYCLE HEADLAMP ASSEMBLY COMPRISING SAID PROTECTIVE GRID

TECHNICAL FIELD

The present disclosure relates to the technical field of headlamps for vehicles, particularly for land transport vehicles, and in particular relates to a protective grid for vehicle headlamp and to a headlamp assembly comprising said protective grid.

BACKGROUND

Land transport vehicles, e.g. road vehicles, generally have multiple lamps aboard adapted and configured to signal the presence of the vehicle to third parties and to illuminate a space in front of the vehicle by emitting a light beam. Among them, headlamps are generally the most delicate because they are more subject to risk of impact with external bodies (e.g. gravel, road debris, hail, vegetation or birds). Such impacts may cause cracks in the transparent screen of headlamp or may cause the transparent screen to shatter into multiple fragments or even in some cases break the headlamp light source, whereby causing, in this case, a total or serious lack of functionality of the headlamp.

For the aforesaid reasons, it is known to associate a protective grid with a land vehicle headlamp, such as a car or a motorcycle, especially if the vehicle is used for driving off-road.

The association of a protective grid with a vehicle lamp, specifically with a headlamp, determines various drawbacks pertaining to the narrowing or in general the partial screening of the light beam emitted by the headlamp and therefore a reduction of the lighting capacity of the headlamp. However, this involves type-approval problems in some countries, since headlamps fitted with protective grids generally do not meet conditions for approval by authorities from the light engineering point of view.

It is the purpose of the present description to provide a protective grid for vehicle headlamp which can solve the aforesaid drawbacks.

Such is achieved by protective grid as defined herein.

The disclosure will be better understood from the following detailed description of particular embodiments, provided by way of example and consequently not limiting in any manner, with reference to the accompanying drawings which are briefly described in the following paragraph.

DETAILED DESCRIPTION

Figure 1:
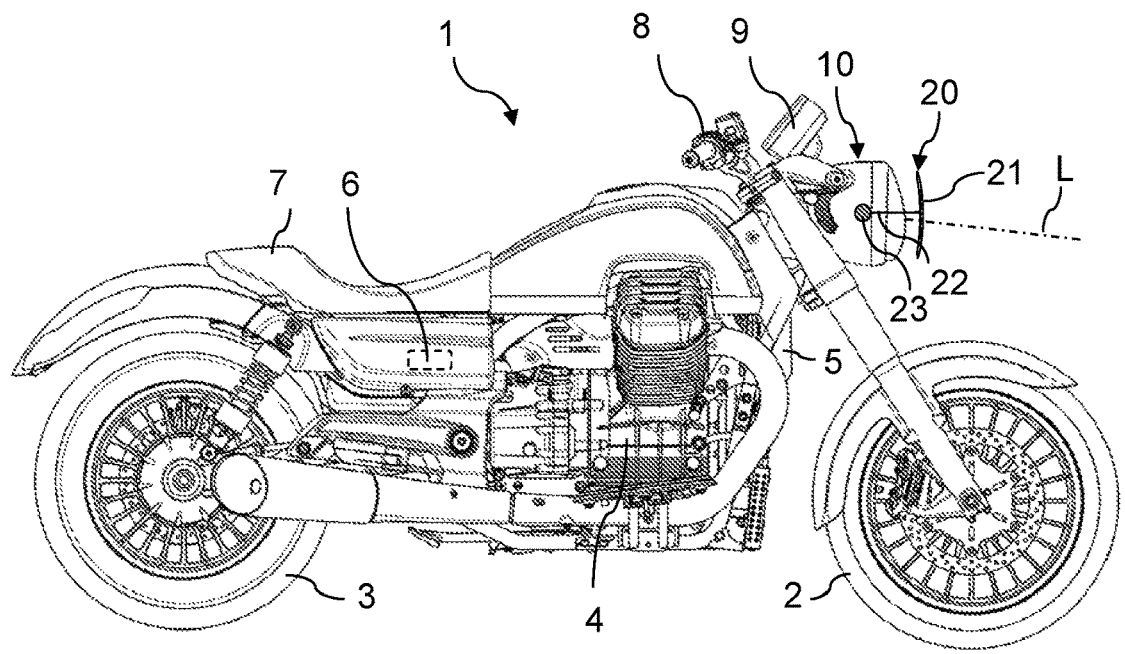
FIG. 1 shows a side view of an embodiment of a non-limiting example of a vehicle comprising a headlamp and a first embodiment of a protective grid operatively coupled to the headlamp, in which the protective grid is shown in a first operating configuration.

Similar or equivalent elements in the accompanying figures are indicated by means of the same reference numerals.

The appended figures show an embodiment of a transport vehicle and in particular of a motorcycle 1. In the particular example shown in the figures, without thereby introducing any limitation, the motorcycle 1 is a two-wheel road motorcycle 1, comprising a front wheel 2 and a rear wheel 3, a traction engine 4, a supporting frame 5, an electronic control unit 6 or ECU of the traction engine 4, a saddle 7, a steering handlebar 8 rotationally attached to the supporting frame 5. The motorcycle 1 also preferably comprises a dashboard 9, operatively connected to the electronic control unit 6.

The traction engine 4 is either directly or indirectly operatively connected to a driving wheel of the motorcycle 1, in the example to the rear wheel 3.

According to an embodiment, the traction engine 4 is an internal combustion engine. According to an alternative embodiment, the traction engine 4 is an electric or hybrid engine.

It is worth noting that the teachings of the present description are not limited to be applied exclusively to motorcycles and may also be applied to other transport vehicles in general, including cars.

The motorcycle 1 comprises a headlamp 10, also called vehicle headlamp, adapted to emit a light beam. The light beam makes it possible to illuminate a portion of ground placed in front of the motorcycle 1, or generally a space in front of the motorcycle 1. In other words, said light beam is emitted from the mouth of the headlamp and allows the illumination of the space in front of the vehicle its motion. Said light beam has a prevalent emission axis L.

Reference numeral 20 globally indicates a protective grid adapted and configured to be operatively coupled to the vehicle headlamp 10. The protective grid 20 comprises at least one grid element 21 and coupling means 22, 23 for operatively coupling the grid element 21 either directly or indirectly to the headlamp 10. When the protective grid 20 is operatively coupled to said headlamp 10, the coupling means 22, 23 are adapted and configured to make it possible to move the grid element 21 with respect to the headlamp 10 so that the grid element 21 can be displaced from a work configuration, shown in FIG. 1, to a rest configuration, shown in FIG. 2, and vice versa. In the work configuration, the grid element 21 is such to intercept the light beam, while in the rest configuration the grid element 21 is arranged so as not to intercept the light beam. Preferably, in the work configuration, the grid element 21 is such to intercept the prevalent light beam emission axis L, while in the rest configuration the grid element 21 is arranged so as not to intercept the prevalent light beam emission axis L. In particular, the light beam has a substantially cylindrical or frustoconical shape which extends from the mouth of the headlamp. In the rest configuration, the grid element 21 superimposes the light beam, whereby intercepting the development area of the cylindrical/frustoconical shaped beam. In the work configuration, instead, the grid element 21 does not superimpose the light beam, whereby maintaining the development area of the cylindrical/frustoconical-shaped beam unchanged.

According to an embodiment, the grid element 21 is a structure comprising a plurality of parallel or crosslinked bars, e.g. metallic, which in the work configuration makes it possible to protect the headlamp 10 from impacts against external bodies, e.g. gravel, road debris, animals, hail or generally other bodies which by impacting against the front light 10 could damage it either completely or in part.

Figure 5:
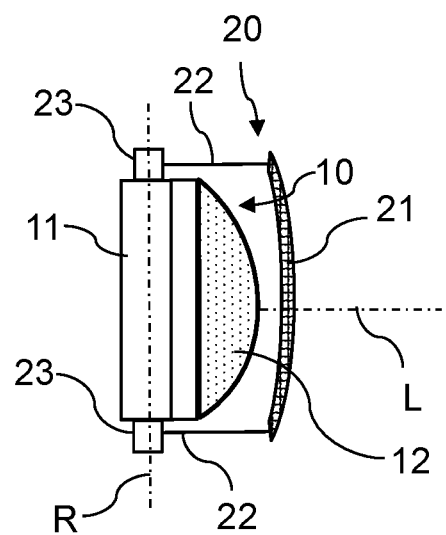
FIG. 5 diagrammatically shows a top plan view of the protective grid in FIGS. 3 and 4, in which the protective grid is shown in the first operating configuration, the assembly diagram of FIG. 5 also being applicable to the embodiment in FIGS. 1 and 2.

As shown in the example illustrated in the figures, the coupling means 22, 23 are preferably in non-limiting manner adapted and configured to allow said at least grid element 21 to rotate about a rotation axis R, only shown in FIG. 5, between two angularly spaced positions, in one of which the grid element 21 is in the work configuration and in the other of which the grid element 21 is in the rest configuration. Preferably, the aforesaid coupling means 22, 23 make it possible to rotatably hinge the grid element to the headlamp 10.

Figure 2:
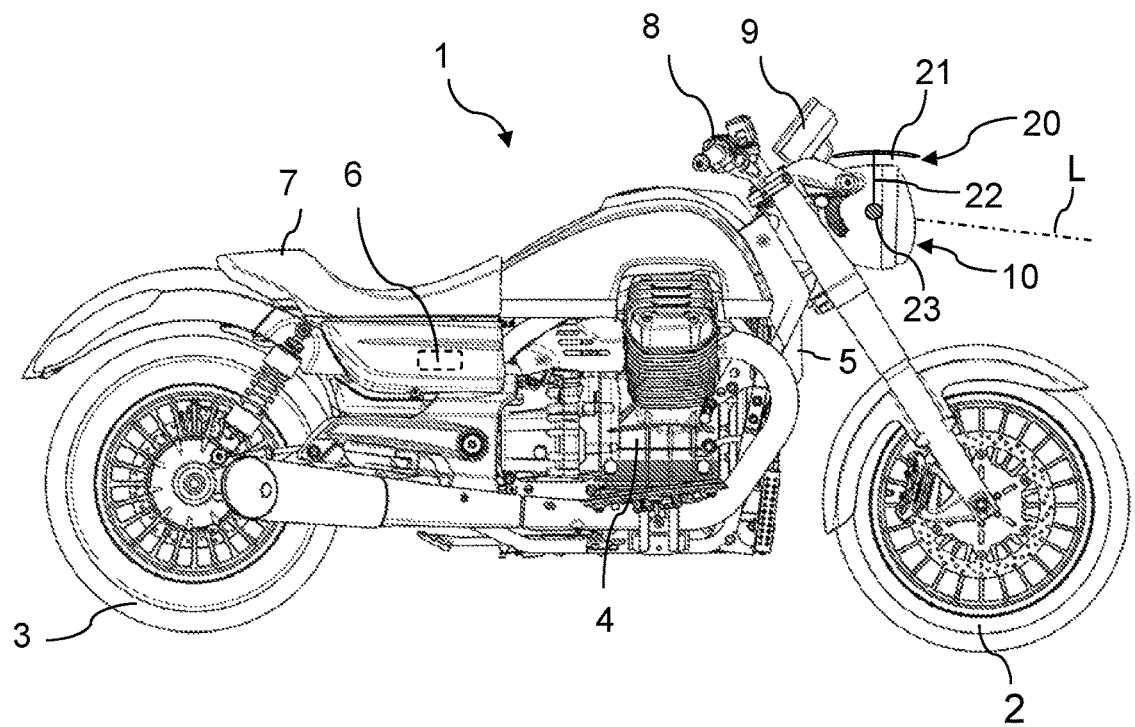
FIG. 2 shows a further side view of the vehicle of FIG. 1, in which the protective grid is shown in a second operating configuration.

In the embodiment in FIGS. 1 and 2, the protective grid 20 comprises only one grid element 21, movable between the work configuration, shown in FIG. 1, and the rest configuration, shown in FIG. 2. For example, the grid element 21 is a circular or oval or elliptical grid.

In an alternative embodiment, the protective grid 20 comprises a plurality of grid elements 21, which in said work configuration are joined together to form a continuous or substantially continuous grid. For example, in the work configuration, the grid elements 21 are arranged adjacent to one another, while in the rest configuration, the grid elements 21 are spaced apart.

Figure 3:
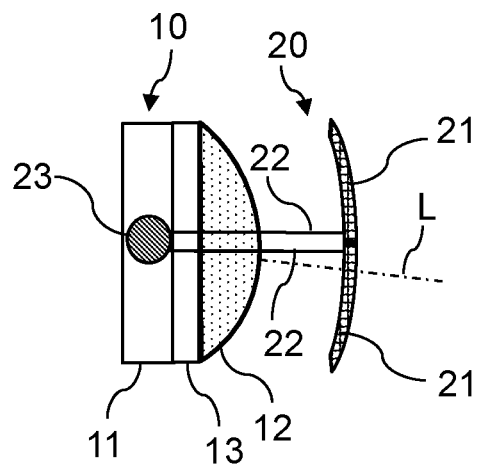
FIG. 3 diagrammatically shows a side view of a second embodiment of a protective grid operatively coupled to a headlamp, in which the protective grid is shown in a first operating configuration.
Figure 4:
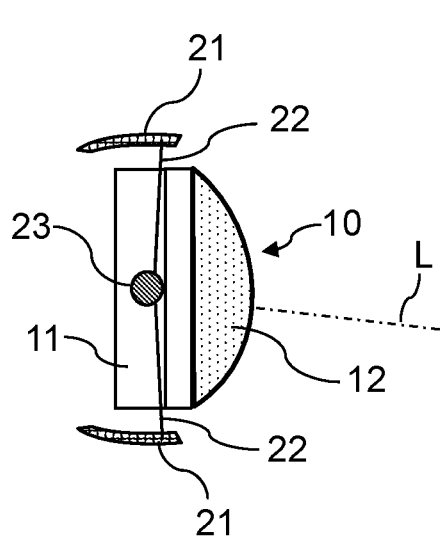
FIG. 4 diagrammatically shows a further side view of the protective grid of FIG. 3, in which the protective grid is shown in a second operating configuration.

Additionally, the grid elements 21 preferably comprise reversible blocking means to establish a reciprocal connection between the grids 21 in the work configuration. For example, a hook element which allows a fast opening/closing may be provided. In particular, FIGS. 3 and 4 diagrammatically show a possible variant embodiment, wherein the protective grid 20 comprises two grid elements 21, which in the work configuration shown in FIG. 3 are arranged adjacent to each other to form a continuous grid, preferably circular or oval or elliptical, and which in the rest configuration shown in FIG. 4 are arranged mutually spaced apart. It is obviously possible to provide further embodiments in which the protective grid 20 comprises more than two grid elements 21, e.g. four grid elements 21 which, for example, when joined together, form a continuous circular or oval or elliptical grid.

According to an advantageous embodiment, consistent with the example shown in FIGS. 3 and 4, if the protective grid 20 comprises a plurality of grid elements, said plurality comprises two grid elements 21 adapted and configured to be rotated, preferably about the same rotation axis R, mutually opposite directions of rotation to pass from the work configuration to its rest configuration and vice versa. In an alternative embodiment, the two grid elements 21 can rotate about mutually different axes of rotation, e.g. parallel, but always preferably in mutually opposite directions of rotation.

The rotation axis of the element grid or the rotation axes of the grid elements are preferably perpendicular to the prevalent light beam emission axis L. For example, in this case, the rotation axis of the element grid 21 or the rotation axes of the grid elements 21 are preferably horizontal.

However, it is worth noting that, if the protective grid 20 comprises a plurality of grid elements 21, it is possible to provide at least two grid elements 21 in said plurality of grid elements 21 which are adapted and configured to rotate respectively about a first and a second rotation axis, wherein the first and second axis of rotation are mutually perpendicular.

According to an embodiment, the coupling means 22, 23 comprise at least two mutually spaced apart supporting brackets 22 having first end portions coupled to the grid element 21 and second opposite end portions adapted and configured to be fixed to said vehicle headlamp 10 and/or in general to said vehicle 1. In the examples shown in the figures, the coupling elements 22, 23 comprise two cylindrical hinges 23 mounted on the headlamp 10. The second end portions of the supporting brackets 22 are fixed to the headlamp 10 by means of these cylindrical hinges 23, having a common rotation axis R. For this reason, the supporting brackets 22 are adapted and configured to be rotated about the rotation axis R.

In the particular example shown, the headlamp 10 comprises a container body 11, e.g. housing at least one light source (e.g. a bulb or an LED) and a reflector and a transparent screen or a lens 12 secured to the container body 11, preferably by means of a ring nut 13. The protective grid 20 preferably and non-limiting manner fixed to the container body 11. In particular, in the example, the protective grid 20 is fixed to the container body 11 through the two cylindrical hinges 23. For example, the transparent screen or the lens 12 is made of glass or plastic material, e.g. polycarbonate.

In an alternative embodiment, instead of being directly fixed to the headlamp 10 the protective grid 20 could be fixed to other components of the forecarriage of a vehicle 1, such as the handlebar 8, the forecarriage itself, a front shield, a fairing portion, a dome, etc.

As clearly shown in the annexes figures according to an advantageous embodiment the rotation axis R crosses, or is adapted and configured to cross, the contained body 11 of the headlamp 10.

According to an advantageous embodiment, the protective grid 20 comprises locking elements, adapted and configured to lock the grid element 21, respectively in the operative work configuration and/or in the operative rest position when the motorcycle is moving (i.e. while driving), so as to prevent an undesired movement of the grid element 21 between said operative positions. In other words, the locking means allow the grid element 21 to be kept in the work or rest configuration (or position) taken during the motion of the vehicle. In this way, for example, it is avoided that in the rest configuration the grid element involuntarily moves or rotates towards the work configuration, for example due to the stresses to which the motorcycle 1 is subjected during driving on a rough or uneven road. In the same way, for example, the locking means prevent the grid element in the work configuration from jolting or moving due to vibrations or stresses during driving. This would cause an undesirable fluctuating variation of the light beam.

Preferably, said locking means comprise attachment elements to which the grid element is fixed in the rest configuration. Alternatively, or in combination the locking means comprise a clamping element at the rotation hinge on which the protection grid 20 is keyed.

For example, the aforesaid locking elements may be integrated into the cylindrical hinges 23. In this case, at least one of the cylindrical hinges 23 comprises a first part having a recess and a second part rotatable with respect to the first part and having a protrusion adapted to fit into the recess when the recess and the projection assume a same angular position, i.e. are radially aligned to each other. The projection is for example a movable body, such as for example a ball or a pin, driven by an elastic element.

According to an advantageous embodiment, the coupling means 22, 23 are adapted and configured to be connected to control means adapted and configured to be actuated in order to control the motion of the grid element 21. For example, such means comprise mechanical elements, e.g. comprise at least one wire element which can be drawn or released by the driver of the vehicle 1, e.g. by acting on an actuation lever located on the handlebar 8. For example, the wire element, e.g. such as a steel cable, may be actuated by means of a drawing or releasing action, e.g. applied by means of the aforesaid operating lever.

According to an advantageous embodiment, the aforesaid control means comprise at least one electric motor which can be actuated to automatically move the grid element 21, or in general an actuator. For example, such electric motor can be actuated by a manual control element, e.g. arranged on the handlebars 8, e.g. such as a key or a button. In this case, it is also possible to check the position of the grid element 21 through the electronic control unit or ECU 6. In this case, it is also possible advantageously to provide an electronic display element which allows the driver to know the operating rest or work configuration in which the grid element 21 is located while driving the vehicle. For example, this information can be displayed on the dashboard 9 of the vehicle 1, e.g. by means of a display or a light.

According to a particularly advantageous embodiment, the vehicle 1 comprises a light sensor operatively connected to the protective grid 20, so as to bring it automatically by means of the aforesaid control means in the operative work configuration during the daytime and in the operative rest configuration during the night.

On the basis of the explanation above, it is thus possible to understand how a protective grid of the type described above makes it possible to achieve the purposes indicated above with reference to the prior art.

Indeed, by virtue of the aforesaid protective grid, it is advantageously possible to benefit from the advantages related to the presence of the protective grid when this is necessary or advisable, e.g. when driving on a road with gravel and/or following other vehicles, by placing the grid element in the work configuration. Concurrently, when either necessary or appropriate, it is possible to maintain or take the protective grid to the rest configuration, e.g. when driving in dark conditions or at night, so as not to reduce the performance of the front light in terms of lighting ability.

It is worth noting that the aforesaid protective grid can be provided with the original equipment installed on new vehicles, by default or optional equipment, or as an accessory to be installed successively, e.g. as a custom accessory.

It is possible, finally, also to foresee that the protective grid is provided already coupled to a headlamp, so as to provide a headlamp assembly which comprises from the beginning the headlamp and the associated protective grid.

Notwithstanding the principle of the disclosure, embodiments and details may be greatly varied with respect to that described and illustrated herein exclusively by way of non-limiting example without because of this departing from the scope of protection of the disclosure as defined in the appended claims.

The invention claimed is:

1. Protective grid adapted and configured to be coupled to a motorcycle headlamp, wherein the motorcycle headlamp is adapted and configured to emit a light beam, the protective grid comprising:
   at least one grid element; and
   coupling means for operatively coupling the grid element, directly or indirectly, to said vehicle headlamp;
   wherein:
      said coupling means, when the protective grid is operatively coupled to said motorcycle headlamp, are adapted and configured for allowing the grid element to be moved such that the grid element can be displaced from a work configuration to a rest configuration, wherein in the work configuration the grid element is such to intercept the light beam and wherein in the rest configuration the grid element is placed so that it does not intercept the light beam; and
      the protective grid comprises reversible locking means configured to keep said at least one grid element in said rest and work configuration during motion of the motorcycle.

2. Protective grid according to claim 1, wherein the protective grid comprises a plurality of grid elements that in said work configuration are joined together to form a continuous grid.

3. Protective grid according to claim 1, wherein the coupling means are adapted and configured to rotate said at least grid element around a rotation axis between two spaced apart angular positions, in one of which the grid element is in the work configuration and in the other of which the at grid element is in the rest configuration.

4. Protective grid according to claim 2, wherein the plurality of grid elements comprises two grid elements which are adapted and configured to be rotated, preferably around said rotation axis, in opposite directions for passing from said work configuration to said rest configuration and vice versa.

5. Protective grid according to claim 2, wherein said grid elements comprise block means adapted to reversibly couple said grid elements to each other.

6. Protective grid according to claim 3, wherein said light beam has a prevalent emission axis and wherein the rotation axis is perpendicular, or substantially perpendicular, to said prevalent emission axis, in particular said rotation axis being a horizontal axis.

7. Protective grid according to claim 3, wherein said headlamp comprises a container body and wherein said rotation axis crosses, or is adapted and configured to cross, said container body.

8. Protective grid according to claim 1, wherein the coupling means comprises at least two spaced apart supporting brackets having first end portions coupled to the grid element and second opposite end portions adapted and configured to be fixed to said motorcycle headlamp and/or to said motorcycle.

9. Protective grid according to claim 3, wherein said supporting brackets are adapted and configured to be rotated around said rotation axis.

10. Protective grid according to claim 1, wherein said coupling means are adapted and configured to be connected to control means adapted and configured to be actuated in order to control the motion of the grid element.

11. Protective grid according to claim 10, wherein said control means comprises at least one wire element that can be actuated by a drawing or releasing action.

12. Protective grid according to claim 10, wherein said control means comprises at least one actuator, in particular an electric motor.

13. Motorcycle headlamp group comprising a motorcycle headlamp and at least one protective grid according to claim 1, wherein the protective grid is operatively coupled to said motorcycle headlamp through said coupling means.

14. Motorcycle comprising at least one protective grid according to claim 1.

15. Motorcycle comprising a motorcycle headlamp group according to claim 13.

* * * * *